(12) United States Patent
Mei (10) Patent No.: US 11,424,637 B2
(45) Date of Patent: Aug. 23, 2022

(54) CHARGING CONTROL METHOD, POWER ADAPTER AND MOBILE TERMINAL

(71) Applicant: ZTE CORPORATION, Guangdong (CN)

(72) Inventor: Xiang Mei, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 127 days.

(21) Appl. No.: 16/606,272

(22) PCT Filed: Apr. 16, 2018

(86) PCT No.: PCT/CN2018/083180
§ 371 (c)(1),
(2) Date: Oct. 18, 2019

(87) PCT Pub. No.: WO2018/192440
PCT Pub. Date: Oct. 25, 2018

(65) Prior Publication Data
US 2020/0185948 A1    Jun. 11, 2020

(30) Foreign Application Priority Data

Apr. 18, 2017 (CN) .......................... 201710254761.3

(51) Int. Cl.
*H02J 7/00* (2006.01)

(52) U.S. Cl.
CPC ...... *H02J 7/00714* (2020.01); *H02J 7/00034* (2020.01); *H02J 7/00036* (2020.01); *H02J 7/0045* (2013.01); *H02J 7/0047* (2013.01)

(58) Field of Classification Search
CPC .... H02J 7/00714; H02J 7/0044; H02J 7/0045; H02J 7/0047; H02J 7/0072; H02J 7/00036
(Continued)

(56) References Cited

U.S. PATENT DOCUMENTS

2014/0225574 A1* 8/2014 Boda ...................... H02J 7/0014
                                                                  320/162
2017/0040804 A1* 2/2017 Hu ...................... H02J 7/007182
(Continued)

FOREIGN PATENT DOCUMENTS

| CN | 103633709 A | 3/2014 |
| CN | 104993182 A | 10/2015 |
| CN | 105305558 A | 2/2016 |

OTHER PUBLICATIONS

WIPO, International Search Report dated Jun. 15, 2018.

*Primary Examiner* — Edward Tso
*Assistant Examiner* — Aaron Piggush
(74) *Attorney, Agent, or Firm* — Cantor Colburn LLP (57) ABSTRACT

The present disclosure relates to a charging control method, including: arranging at least one detection resistor corresponding to charging mode at an output end of a power adapter; determining the charging mode; obtaining a resistance value of the detection resistor corresponding to the charging mode and voltage values at two ends of the detection resistor according to the determined charging mode, and sending the voltage values and the resistance value of the detection resistor to a mobile terminal; and stopping charging when control information for stopping the charging sent by the mobile terminal is received. The present disclosure further relates to a power adapter and a mobile terminal.

5 Claims, 5 Drawing Sheets

(58) Field of Classification Search
USPC ........ 320/112, 114, 134, 156, 161, 162, 164
See application file for complete search history.

(56) References Cited

U.S. PATENT DOCUMENTS

2017/0155263 A1* 6/2017 Chen ......................... H02J 7/04
2017/0250555 A1* 8/2017 Zhang .................. H02J 7/0029

* cited by examiner

FIG. 6

CHARGING CONTROL METHOD, POWER ADAPTER AND MOBILE TERMINAL

CROSS REFERENCE TO RELATED APPLICATION

This application is a National Phase Application filed under 35 U.S.C. 371 as a national stage of PCT/CN2018/083180, filed on Apr. 16, 2018, an application claiming the priority of the Chinese patent application No. 201710254761.3, filed on Apr. 18, 2017, the contents of which are incorporated herein by reference in their entirety.

TECHNICAL FIELD

The present disclosure relates to a terminal charging management technology, and in particular, to a charging control method, a mobile terminal and a power adapter.

BACKGROUND

Currently, mobile terminals such as mobile phones usually fail during charging, and reasons for the failure are generally short-circuiting of a universal serial bus (USB) interface, slowing charging or no charging caused by an electric leakage phenomenon of charging peripheral circuits of the mobile phone, etc. Generally, the short-circuiting of a charging circuit or the failure of electric leakage may cause that the mobile phone is not charged or is charged slowly, and even may cause serious economic loss such as fire and personal casualty accidents. Therefore, it is necessary to detect charging failures for the mobile phone, for example, the short-circuiting of the charging circuit (including short-circuiting of the USB interface) and a leakage current of the peripheral circuits of the mobile phone. Once the short-circuiting or the electric leakage phenomenon occurs, a user may be informed in time to stop charging in order to carry out danger avoiding process.

In related arts, methods for detecting and protecting the charging circuit of the mobile phone include over-temperature protection, over-current protection, over-charge protection, over-discharge protection and the like, however these methods only may ensure that a battery itself or a charging chip does not have a safety problem, but there is no effective method for detecting the short-circuiting or the electric leakage for the charging peripheral circuits, such as a USB connector, an electro-static discharge (ESD) protection and surge protection circuit and the like, and if a case such as the short-circuiting or the electric leakage occurs in the peripheral circuits of the mobile phone, such as the USB connector, the ESD protection and surge protection circuit and the like, the charging may be not performed or may be performed slowly, and even accidents such as fire may be caused.

SUMMARY

Embodiments of the present disclosure provide a charging control method, a mobile terminal and a power adapter for detecting abnormal cases of peripheral circuits in a charging process of the mobile terminal, processing and alarming in time and avoiding accidents.

The embodiments of the present disclosure provide a charging control method including arranging at least one detection resistor corresponding to charging mode at an output end of a power adapter; determining the charging mode; obtaining a resistance value of the detection resistor corresponding to the charging mode and voltage values at two ends of the detection resistor according to the determined charging mode, and sending the voltage values and the resistance value of the detection resistor to a mobile terminal; and stopping charging when control information for stopping the charging sent by the mobile terminal is received.

The embodiments of the present disclosure provide a charging control method including obtaining voltage values at two ends of a detection resistor arranged at an output end of a power adapter and a resistance value of the detection resistor; determining an output current value of the power adapter according to the voltage values and the resistance value of the detection resistor; detecting a current value charged in a battery of a mobile terminal, and comparing the output current value of the power adapter with the current value charged in the battery; and stopping charging the battery of the mobile terminal and sending control information for stopping the charging to the power adapter, when it is determined that the mobile terminal is abnormally charged according to the comparison result.

The embodiments of the present disclosure provide a power adapter including an arranging module configured to arrange at least one detection resistor corresponding to charging mode at an output end of the power adapter; a first determining module configured to determined a charging mode; a first processing module configured to obtain a resistance value of the detection resistor corresponding to the charging mode and voltage values at two ends of the detection resistor according to the charging mode determined by the first determining module, and send the voltage values and the resistance value of the detection resistor to a mobile terminal; and a control module configured to stop charging when control information for stopping the charging sent by the mobile terminal is received.

The embodiments of the present disclosure provide a power adapter including a second determining module configured to obtain voltage values at two ends of a detection resistor arranged at an output end of a power adapter and a resistance value of the detection resistor, and determine an output current value of the power adapter according to the voltage values and the resistance value of the detection resistor; and a second processing module configured to detect a current value charged in a battery of the mobile terminal, and compare the output current value of the power adapter with the current value charged in the battery, wherein the second processing module stops charging the battery of the mobile terminal and sends control information for stopping the charging to the power adapter, when it is determined that the mobile terminal is abnormally charged according to the comparison result.

The embodiment of the present disclosure provide computer-readable storage medium having stored thereon a computer program which, when executed by a processor, causes the processor to execute the charging control method according to the present disclosure.

BRIEF DESCRIPTION OF THE DRAWINGS

Various other advantages and benefits will become apparent to those of ordinary skill in the art by reading the following detailed description. The accompanying drawings are only for purposes of illustrating various embodiments and are not to be construed as limiting the disclosure. Like parts are designated by like reference numerals throughout the accompanying drawings, in which.

DETAILED DESCRIPTION

Hereinafter, embodiments of the present disclosure will be described in detail with reference to the accompanying drawings. It should be understood that the specific embodiments described herein are intended merely to explain the present disclosure by way of example and are not intended to limit the scope of the present disclosure.

The present disclosure is further described in detail below with reference to the accompanying drawings and specific embodiments.

Figure 1:
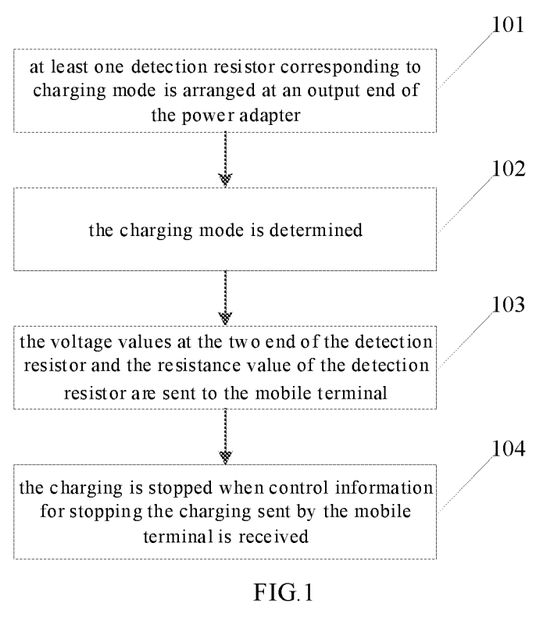
FIG. 1 is a schematic flow chart of a charging control method on a power adapter side according to an embodiment of the present disclosure.

FIG. 1 is a schematic flow chart of a charging control method on a power adapter side according to an embodiment of the present disclosure.

As shown in FIG. 1, the charging control method according to an embodiment of the present invention may include steps 101 to 104.

At step 101, at least one detection resistor corresponding to charging mode is arranged at an output end of the power adapter.

In practical applications, different voltage values and different current values are output under different charging modes, therefore, according to the embodiment of the disclosure, a certain number of detection resistors corresponding to the charging modes are arranged at the output end of the power adapter, voltages which may be identified by a mobile terminal may be generated at two ends of each detection resistor, and meanwhile, the detection resistors do not influence output power of the power adapter.

The charging modes may be charging modes under different charging protocols such as BC 1.2, QC 2.0, QC 3.0 or other charging protocols and the like. The detection resistors should include at least a detection resistor corresponding to the BC 1.2 charging protocol. If the power adapter is a power adapter dedicated to a specific mobile terminal, a detection resistor corresponding to the charging mode supported by the mobile terminal is additionally arranged on the base of arranging the detection resistor corresponding to the BC 1.2 protocol. If the power adapter is a universal power adapter, a plurality of detection resistors respectively corresponding to a plurality of charging protocols may be additionally arranged according to actual requirements on the basis of arranging the detection resistors corresponding to the BC 1.2 protocol. In practical applications, the power adapter is usually provided with one detection resistor corresponding to the BC 1.2 protocol and another detection resistor corresponding to the latest QC charging protocol.

At step 102, the charging mode is determined.

After the power adapter is connected with the mobile terminal through a USB data line, the charging mode supported by the mobile terminal may be determined according to a protocol adopted during handshaking. In practical applications, the protocol adopted during handshaking may be set by a mobile terminal manufacturer itself, or may be an international standard protocol. After the power adapter is connected with the mobile terminal through the USB data line, the power adapter communicates with the mobile terminal to determine a charging protocol supported by the mobile terminal, for example, BC 1.2, QC 2.0, QC 3.0 or other charging protocols. According to the determined charging protocol, the power adapter provides voltage and current specified by the charging mode.

At step 103, a resistance value of the detection resistor corresponding to the charging mode and voltage values at two ends of the detection resistor are obtained according to the determined charging mode, and the voltage values and the resistance value of the detection resistor are sent to the mobile terminal.

The voltage values may be input into a data minus (DM) signal and a data positive (DP) signal of a USB interface of the power adapter, and sent to the mobile terminal through the USB data line.

In the power adapter, after the detection resistor corresponding to the charging mode is connected in series to the output end of the power adapter, the voltage values at the two ends of the detection resistor may be converted into digital signals through a digital-to-analog converter, the higher voltage value in the two voltage values is input into the DP signal of the USB data line, and the lower voltage value in the two voltage values is input into the DM signal of the USB data line. And the resistance value of the detection resistor and the voltage values at the two ends of the detection resistor are converted into data packets through a USB communication protocol in order to be sent to the mobile terminal.

At step 104, the charging is stopped when control information for stopping the charging sent by the mobile terminal is received.

The control information sent by the mobile terminal may be control information for stopping the charging or control information for continuing the charging. Correspondingly, after receiving the control information sent by the mobile terminal, the power adapter performs corresponding operation on the mobile terminal according to the control information. If the control information for stopping the charging is received, the charging is stopped.

Figure 2:
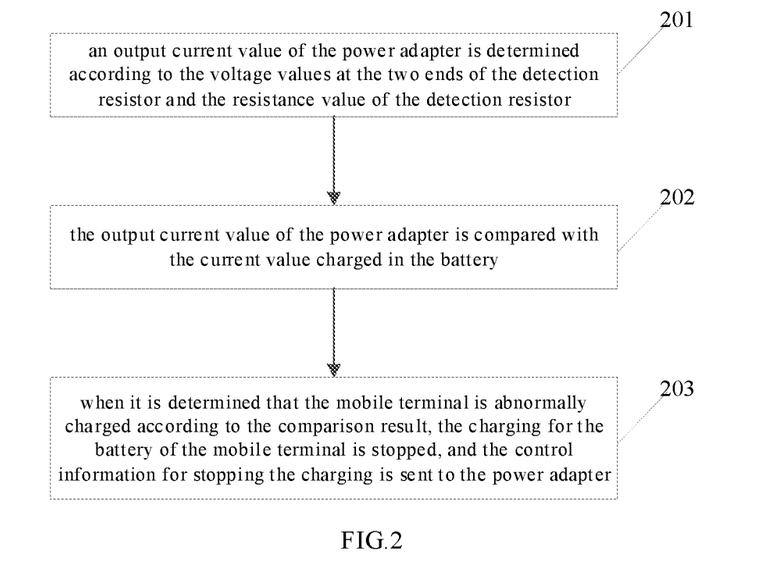
FIG. 2 is a schematic flow chart of a charging control method on a mobile terminal side according to an embodiment of the present disclosure.

FIG. 2 is a schematic flow chart of a charging control method on a mobile terminal side according to an embodiment of the present disclosure.

As shown in FIG. 2, the charging control method according to an embodiment of the present disclosure may include steps 201 to 203.

At step 201, voltage values at two ends of a detection resistor arranged at an output end of a power adapter and a resistance value of the detection resistor are obtained, and an output current value of the power adapter is determined according to the voltage values and the resistance value of the detection resistor.

After receiving the voltage values at the two ends of the detection resistor and the resistance value of the detection resistor sent by the power adapter, the mobile terminal calculates the output current value of the output end of the power adapter in real time or periodically, and the output current value of the adapter may be obtained through the following formula:

$$I_{bus}=(V_{DM}-V_{DP})/R,$$

wherein $I_{bus}$ is the output current value of the adapter, R is the resistance value of the detection resistor, and $V_{DM}$ and $V_{DP}$ are the voltage values at the two ends of the detection resistor respectively.

Prior to the step 201, the method may further include connecting the mobile terminal with the power adapter through the USB data line and determining the supported charging mode according to the protocol adopted during handshaking.

The mobile terminal performs handshaking communication with the power adapter through the USB data line. Handshaking communication may include determining whether the power adapter is provided with a detection resistor. If the detection resistor is provided, the mobile terminal starts a charging control function, receives the resistance value of the detection resistor of the power adapter and the voltage values at the two ends of the detection resistor, and determines the output current value of the power adapter according to the resistance value of the detection resistor and the voltage values. If the detection resistor is not provided, the mobile terminal does not start the charging control function and only charges for a battery of the mobile terminal after the charging mode is determined.

At step 202, a current value charged in the battery of the mobile terminal is detected, and the output current value of the power adapter is compared with the current value charged in the battery.

The comparison may include subtracting the current value charged in the battery from the output current value of the power adapter to determine a current difference value; and comparing the current difference value with a preset current threshold value, and determining that the mobile terminal is abnormally charged when the current difference value exceeds the current threshold value.

After the mobile terminal obtains the current value $I_{charge}$ flowing into the battery during the charging process, the current value $I_{charge}$ charged into the battery is subtracted from the output current value $I_{bus}$ of the power adapter determined in step 201 to obtain the current difference value $I_{leakega}$, i.e., $I_{leakega}=I_{bus}-I_{charge}$. Then, the current difference value $I_{leakega}$ is compared with the preset current threshold value, and it is determined that the mobile terminal is abnormally charged when the current difference value $I_{leakega}$ is larger than the current threshold value.

At step 203, when it is determined that the mobile terminal is abnormally charged according to the comparison result, the charging for the battery of the mobile terminal is stopped, and the control information for stopping the charging is sent to the power adapter.

When it is determined that the mobile terminal is abnormally charged, the charging for the battery of the mobile terminal is stopped, and the control information for stopping the charging is sent to the power adapter. In addition, the mobile terminal may remind a user of abnormity in the current charging process through sound, vibration or reminder information displayed on a display screen.

Figure 3:
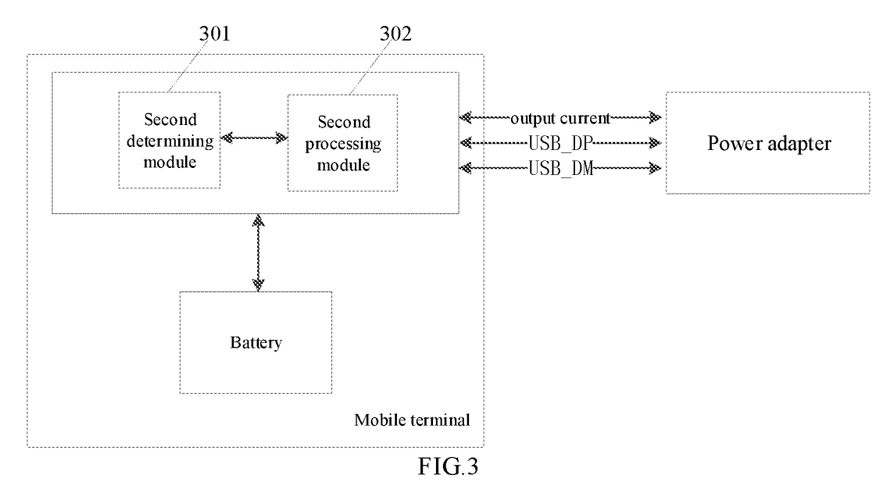
FIG. 3 is a schematic structural diagram of a mobile terminal according to an embodiment of the present disclosure.

FIG. 3 is a schematic structural diagram of a mobile terminal according to an embodiment of the present disclosure.

As shown in FIG. 3, the mobile terminal according to an embodiment of the present disclosure may include a second determining module 301 and a second processing module 302.

The second determining module 301 is configured to obtain the voltage values at the two ends of the detection resistor arranged at the output end of the power adapter and the resistance value of the detection resistor, and to determine the output current value of the power adapter according to the voltage values and the resistance value of the detection resistor.

The second processing module 302 is configured to detect the current value charged in the battery of the mobile terminal, and compare the output current value of the power adapter with the current value charged in the battery of the mobile terminal. When it is determined that the mobile terminal is abnormally charged according to the comparison result, the second processing module 302 stops charging the battery of the mobile terminal and sends control information for stopping the charging to the power adapter.

The second processing module 302 may subtract the current value charged in the battery from the output current value of the power adapter to determine the current difference value, and compare the current difference value with the preset current threshold value. The second processing module 302 may determine that the mobile terminal is abnormally charged when the current difference value exceeds the current threshold.

The mobile terminal is connected with the power adapter through the USB data line, and the second determining module 301 determines the supported charging mode according to the protocol adopted during handshaking.

In practical applications, both the second determining module 301 and the second processing module 302 may be implemented by a central processing unit (CPU), a microprocessor unit (MPU), a digital signal processor (DSP), a field programmable gate array (FPGA) or the like, which are located on the mobile terminal.

Figure 4:
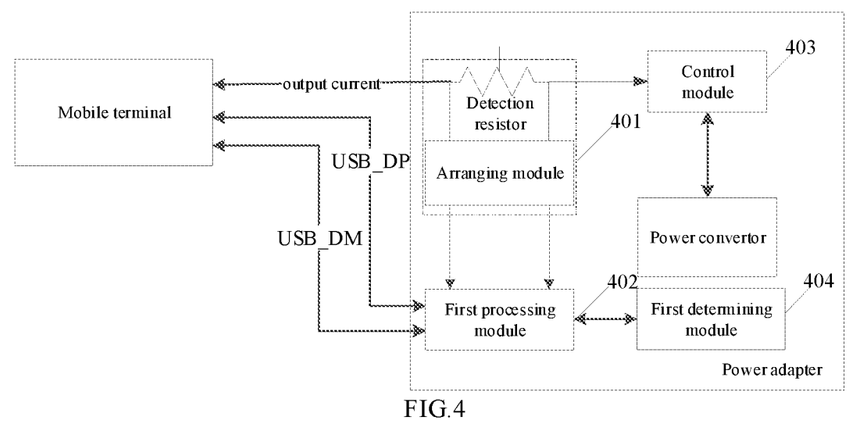
FIG. 4 is a schematic structural diagram of a power adapter according to an embodiment of the present disclosure.

FIG. 4 is a schematic structural diagram of a power adapter according to an embodiment of the present disclosure.

As shown in FIG. 4, the power adapter according to an embodiment of the present disclosure may include an arranging module 401, a first processing module 402, a control module 403, and a first determining module 404.

The arranging module 401 is configured to arrange at least one detection resistor corresponding to charging mode at an output end of a power adapter.

The first determining module 404 is configured to determine the charging mode.

The first processing module 402 is configured to obtain a resistance value of the detection resistor corresponding to the charging mode and voltage values at two ends of the detection resistor according to the charging mode determined by the first determining module 404, and send the voltage values and the resistance value of the detection resistor to a mobile terminal.

The control module 403 is configured to stop the charging when the control information for stopping the charging sent by the mobile terminal is received.

After connecting to the mobile terminal through the USB data line, the first determining module 404 determines the charging mode supported by the mobile terminal according to the protocol adopted during handshaking.

The first processing module 402 inputs the voltage values at the two ends of the detection resistor into the DM signal and the DP signal of the USB interface of the power adapter, and sends the voltage values to the mobile terminal through the USB data line.

In practical applications, the arranging module 401, the first processing module 402, the control module 403, and the first determining module 404 may be implemented by a CPU, an MPU, a DSP or an FPGA, etc., which are located on the power adapter.

Figure 5:
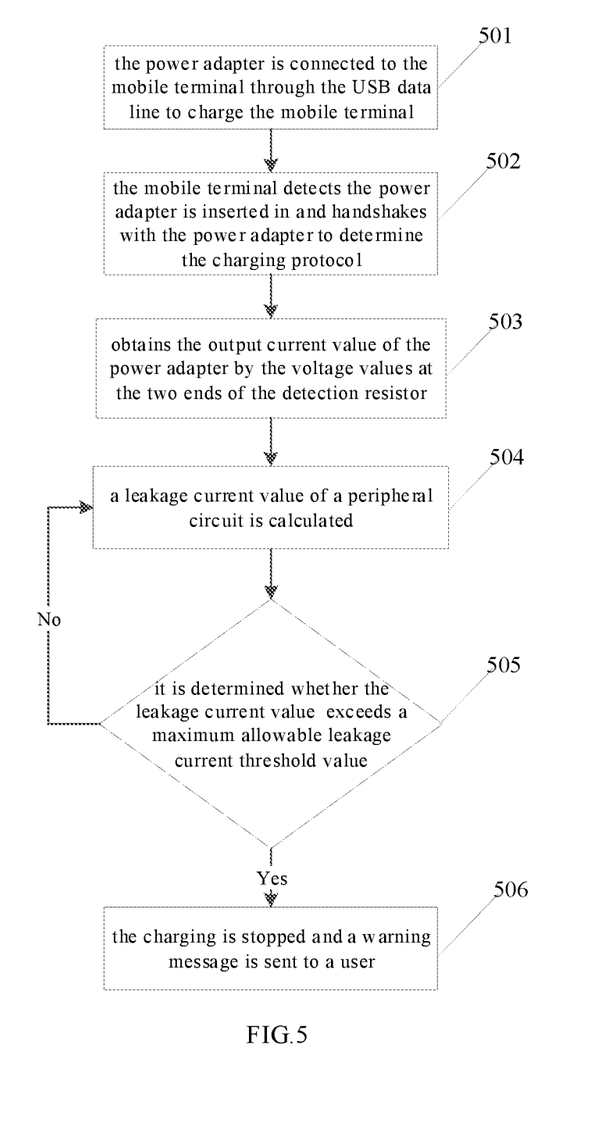
FIG. 5 is a schematic flow chart of a charging control method according to an embodiment of the present disclosure.
Figure 6:
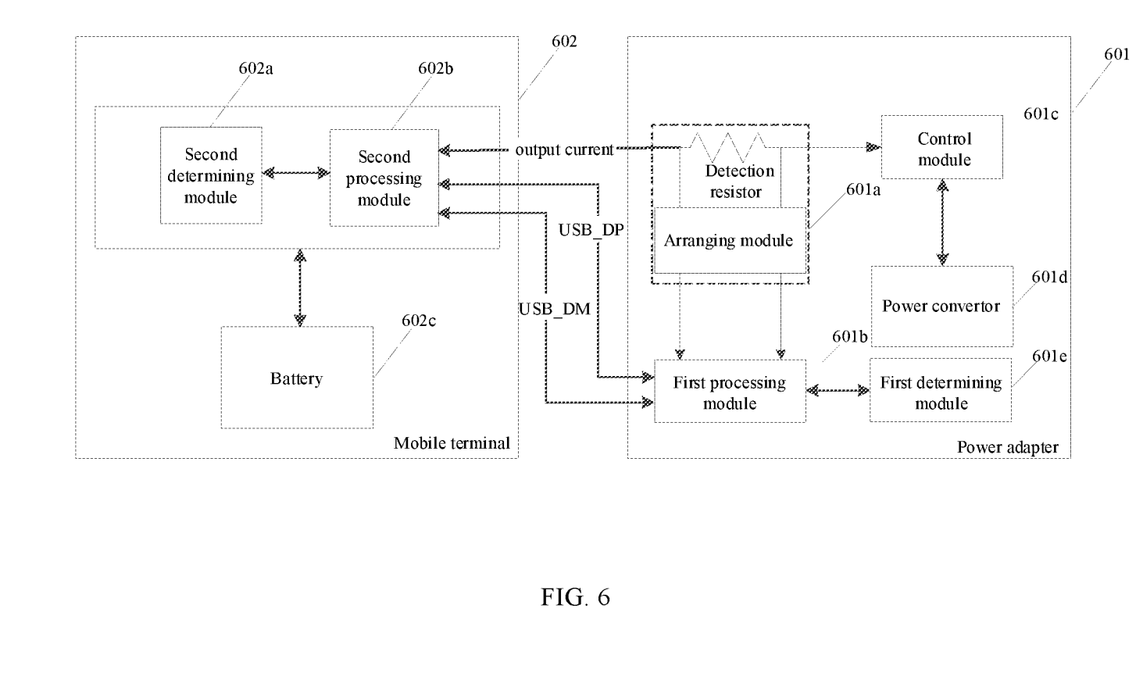
FIG. 6 is a schematic structural diagram of connection between a mobile terminal and a power adapter through a USB data line according to an embodiment of the present disclosure.

FIG. 5 is a schematic flow chart of a charging control method according to an embodiment of the present disclosure, and FIG. 6 is a schematic structural diagram of connection between a mobile terminal and a power adapter through a USB data line according to an embodiment of the present disclosure. The charging control method according to the embodiment of the present disclosure is described in detail below with reference to FIGS. 5 and 6 by taking the mobile terminal connected to the power adapter through the USB data line as an example.

As shown in FIG. 5, the charging control method according to an embodiment of the present disclosure may include steps 501 to 506.

At step 501, the power adapter is connected to the mobile terminal through the USB data line to charge the mobile terminal. One end of the USB data line is inserted into the power adapter 601, and the other end is inserted into the mobile terminal 602.

At step 502, the mobile terminal detects the power adapter is inserted in and handshakes with the power adapter to determine the charging protocol. A second processing module 602b of the mobile terminal 602 handshakes with a first processing module 601b of the power adapter 601, and a first determining module 601e and a second determining module 602a determine the charging mode, and then according to the determined one protocol among BC 1.2, QC 2.0, QC 3.0 or other charging protocols, the first processing module 601b sends a control command to a control module 601c to control a power converter 601d to convert the 220V voltage into a voltage specified in the protocol to charge the mobile terminal 602.

At step 503, the second processing module 602b obtains the output current value of the power adapter by the voltage values at the two ends of the detection resistor. After the handshaking between the mobile terminal 602 and the power adapter 601 is successful in step 502, the power adapter 601 triggers a setting module 601a to arrange a detection resistor corresponding to the charging mode at the output end of the power adapter, and inputs the voltage values at the two end of the detection resistor into the DP signal and the DM signal of the USB, so as to provide voltage values to the determining module 602a of the mobile terminal 602 to calculate and obtain the output current value $I_{bus}$ of the power adapter 601 according to the following formula:

$$I_{bus}=(V_{DM}-V_{DP})/R,$$

wherein, R is the resistance value of the detection resistor, and $V_{DM}$ and $V_{DP}$ are the voltage values at the two ends of the detection resistor respectively.

At step 504, a leakage current value of a peripheral circuit is calculated. The second processing module 602b obtains the output current $I_{bus}$ of the power adapter 601, obtains the current value $I_{charge}$ charged in the battery of the mobile terminal 602, and then calculates the leakage current value $I_{leakega}$ of the peripheral circuit according to the following formula:

$$I_{leakega}=I_{bus}-I_{charge}$$

At step 505, it is determined whether the leakage current value $I_{leakega}$ exceeds a maximum allowable leakage current threshold value, and if yes, step 506 is executed; and if not, the method returns to step 504 to continue detecting the leakage current value.

According to the calculated leakage current value $I_{leakega}$ of the peripheral circuit, if $I_{leakega}$ is larger than the maximum allowable leakage current of the mobile terminal 602, it may be determined that there is short-circuiting or electric leakage occurs.

At step 506, the charging is stopped and a warning message is sent to a user. When it is determined that the charging is abnormal, the second processing module 602b in the mobile terminal 602 controls to stop charging a battery 602c and sends the warning message to the user, and sends the control message for stopping the charging to the power adapter 601 at the same time. The control module 601c of the power adapter 601 disconnects the connection with the power converter 601d and controls other parts in the power adapter to stop working after receiving the control message for stopping the charging.

As described above, the charging control method, the mobile terminal and the power adapter according to the embodiments of the present disclosure may detect short-circuiting or electric leakage of the charging peripheral circuit, and when an abnormal case occurs, the mobile terminal may be controlled to stop the charging and the power adapter may be controlled to stop working, so as to avoid a serious accident and loss caused by short-circuiting of the peripheral circuit.

The above description is only embodiments of the present disclosure, and is not intended to limit the scope of the present disclosure, and any modifications, equivalent substitutions, improvements, etc. that are made within the spirit and principle of the present disclosure are intended to be included within the scope of the present disclosure.

The invention claimed is:

1. A charging control method comprises:
   arranging at least one detection resistor corresponding to a charging mode at an output end of a power adapter;
   determining the charging mode;
   obtaining a resistance value of the detection resistor corresponding to the charging mode and voltage values at two ends of the detection resistor according to the determined charging mode, and sending the voltage values and the resistance value of the detection resistor to a mobile terminal; and
   stopping charging when control information for stopping the charging sent by the mobile terminal is received;
   wherein the sending the voltage values and the resistance value of the detection resistor to the mobile terminal comprises:
   inputting the voltage values into a data minus DM signal and a data positive DP signal of a universal serial bus (USB) interface of the power adapter; and
   sending the resistance value of the detection resistor and the voltage values to the mobile terminal through a USB data line.

2. The charging control method of claim 1, wherein the determining the charging mode comprises:
   after the power adapter is connected with the mobile terminal through a universal serial bus (USB) data line, determining the charging mode supported by the mobile terminal according to a protocol adopted during handshaking.

3. A non-transitory computer-readable storage medium having stored thereon a computer program which, when executed by a processor, causes the processor to execute the charging control method according to claim 1.

4. A power adapter comprises:
- an arranging module configured to arrange at least one detection resistor corresponding to a charging mode at an output end of the power adapter;
- a first determining module configured to determine the charging mode;
- a first processing module configured to obtain a resistance value of the detection resistor corresponding to the charging mode and voltage values at two ends of the detection resistor according to the charging mode determined by the first determining module, and send the voltage values and the resistance value of the detection resistor to a mobile terminal; and
- a control module configured to stop charging when control information for stopping the charging sent by the mobile terminal is received;
- wherein the first processing module inputs the voltage values into a data minus DM signal and a data positive DP signal of a USB interface of the power adapter, and sends the resistance value of the detection resistor and the voltage values to the mobile terminal through a USB data line.

5. The power adapter of claim 4, wherein the first determining module determines a charging mode supported by the mobile terminal according to a protocol adopted during handshaking after the power adapter is connected with the mobile terminal through a Universal Serial Bus (USB) data line.

* * * * *